United States Patent [19]
Fearnside

[11] 4,245,253
[45] Jan. 13, 1981

[54] FRAME-RATE CONVERTING FILM SCANNER HAVING CONTINUOUSLY VARIABLE PROJECTION SPEED

[75] Inventor: William T. Fearnside, Victor, N.Y.

[73] Assignee: Eastman Kodak Company, Rochester, N.Y.

[21] Appl. No.: 68,029

[22] Filed: Aug. 20, 1979

[51] Int. Cl.³ .............................................. H04N 3/36
[52] U.S. Cl. .................................................. 358/214
[58] Field of Search ................. 358/214, 215, 216, 54, 358/130, 132

[56] References Cited

U.S. PATENT DOCUMENTS

| | | | |
|---|---|---|---|
| 2,666,356 | 1/1954 | Graham | 352/108 |
| 2,818,467 | 12/1957 | Harris et al. | 358/215 |
| 2,890,277 | 5/1953 | Duke | 358/216 |
| 2,922,841 | 1/1960 | Graziano | 358/216 |
| 3,651,254 | 3/1972 | Metzger | 358/216 |
| 3,790,707 | 2/1974 | Valenta | 358/216 |
| 3,809,807 | 5/1974 | Bulharowski | 358/216 |
| 4,148,071 | 4/1979 | Zinchuk | 358/214 |

OTHER PUBLICATIONS

Wright, "Solid State Sensors: The Use of a Single Dimension 512 Element Array for Film Scanning", BBC Research Report No. 1973/32.

Primary Examiner—John C. Martin
Attorney, Agent, or Firm—Thomas H. Close

[57] ABSTRACT

Frame-rate converting film scanning apparatus capable of scanning film (having frame location indicia) projected at any speed, selected from within a range of speeds, to produce a television signal having a standard field rate is disclosed. The scanning apparatus is of the type employing a solid-state line sensor for scanning a projected image of the film in a direction generally perpendicular to the length of the film and a rotating multifacet mirror to displace the projected image relative to the line sensor for effecting a raster scan of a film frame to produce a standard television signal. The apparatus includes a frame position sensor responsive to a frame-rate converted image of the frame location indicia for producing a frame location signal. The speed of rotation of the mirror is controlled by a phase locked loop servo that employs a standard television vertical synchronization signal as a reference and receives the frame location signal as a feedback signal. The speed of rotation of the mirror is controlled by the phase locked loop such that the frame location signal and the vertical synchronization signal are in phase, thereby insuring proper frame-rate conversion regardless of the film projection speed.

1 Claim, 1 Drawing Figure

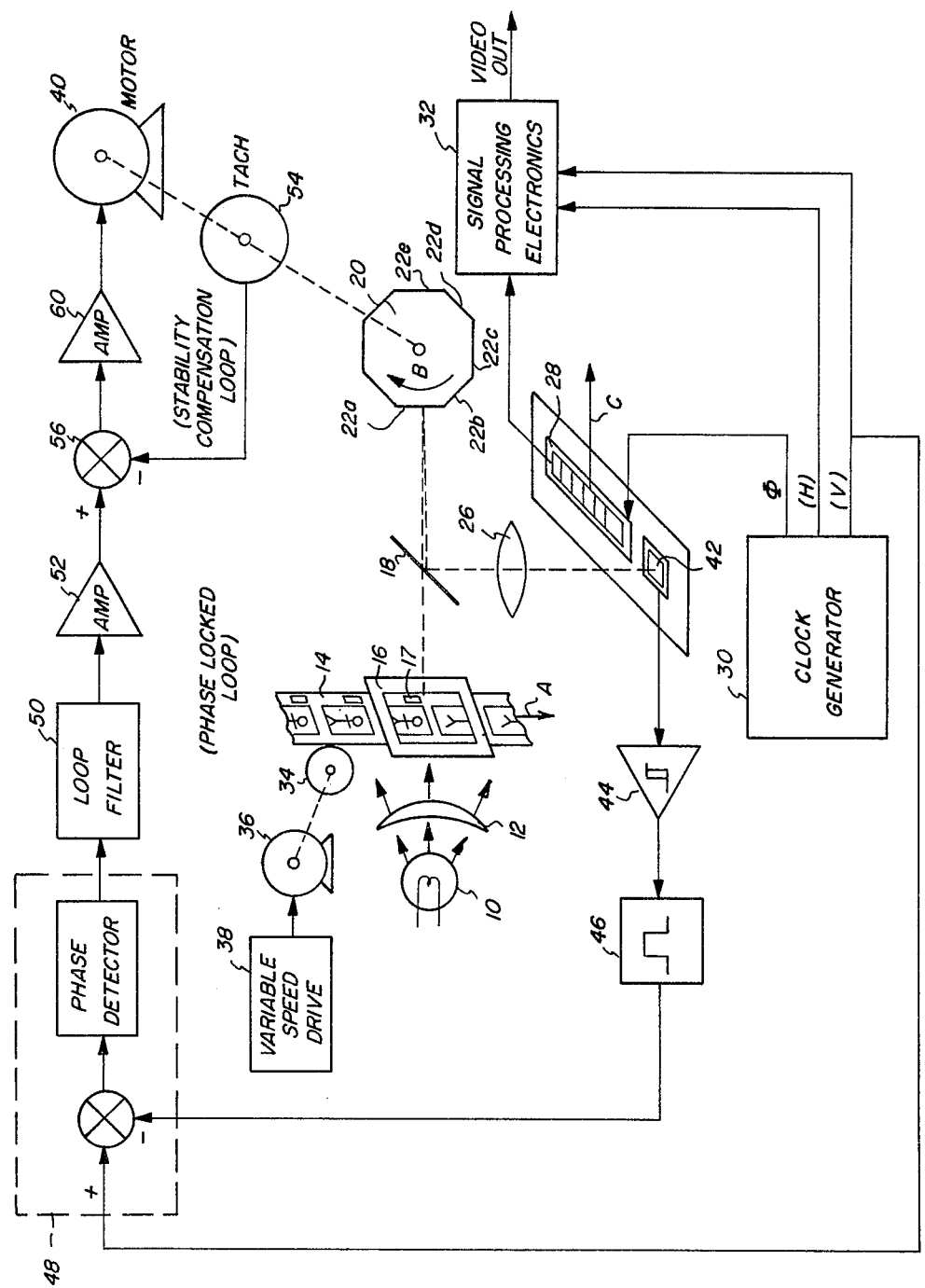

FRAME-RATE CONVERTING FILM SCANNER HAVING CONTINUOUSLY VARIABLE PROJECTION SPEED

BACKGROUND OF THE INVENTION

1. Field of the Invention

This invention relates to frame-rate converting film scanners of the type having a line sensor for scanning an image of the film in one direction and a rotating multifacet mirror for displacing the image relative to the line sensor in a direction generally perpendicular to the line scan direction, and more particularly to a control system for controlling the speed of rotation of the rotating mirror relative to the speed of the film drive in such a scanner.

2. Discussion Related to the Problem

Apparatus for scanning motion picture film to produce a television signal is well known. In such film scanning apparatus, a film frame is scanned in a direction generally perpendicular to the length of the film at a standard television line rate. The line scan is displaced in a direction generally parallel with the length of the film at a standard television field rate. In the past, the line scan has been accomplished by flying spot scanners employing Nipkow discs, movable reflecting elements or cathode ray tubes. The use of a solid-state line sensing array as an alternative to a flying spot scanner to provide line scanning in a film scanner has been proposed. See D. T. Wright, "Solid-State Sensors; The Use of a Single Dimension 512-Element Array for Film scanning", BBC Research Department Report No. 1973/32. The potential advantages of a line sensing array over a flying spot scanner are numerous, including: reduced size, weight, maintenance and cost.

These advantages make the solid-state line sensing array particularly attractive for use in a film scanner for displaying amateur movie film on a home television set. A technique for converting an 18 frame per second motion picture film to a 60 field per second television signal is disclosed in copending U.S. Patent application Ser. No. 68,031 entitled FILM SCANNING METHOD AND APPARATUS EMPLOYING OPTICAL SPLICE TECHNIQUE FOR FRAME-RATE CONVERSION, filed by D. G. Howe on the same day as this application. The scanning apparatus includes a solid-state line sensing array for scanning a projected image of the film in a direction generally perpendicular to the length of the film, and a rotating multifacet mirror comprising a reflecting polygon for displacing images reflected from the facets of the polygon relative to the line sensor in a direction generally parallel to the length of the film. The polygon is rotated at a rate such that the sum of the motion of the film through the projector plus the effect of the rotating polygon causes a full frame to sweep past the line sensor in the time required to scan a television field. Thus, if the film is projected at X frames per second (e.g. 18) and the polygon is rotated at Y facets per second (e.g. 42), the output signal of the scanner will represent Z fields per second, where $Z = X + Y$ (60 fields per second in the example.) In the apparatus disclosed by Howe, the film drive and polygon drive motors are both controlled by phase locked loop servo systems to insure that the film rate plus the polygon facet rate yield the desired frame-rate conversion.

As it turns out, the horizontal synchronization signal in an NTSC television is divisible both by 18 and 42, therefore the reference signals required for the phase locked loops can be generated simply by dividing the 15,750 Hz horizontal synchronization signal by 875 to yield the 18 Hz reference; and by 375 to yield the 42 Hz reference signal. Although several other film-speed/facet-rate combinations can be achieved by employing this scheme, continuously variable film projection rates are not practically implemented. It would be desirable to provide continuously variable film projection rates in such a film scanner. The problem therefore is to provide a control system whereby, when the frame projection rate X is varied continuously over a range, the polygon facet rate Y will be automatically chosen such at $X + Y = Z$, where Z is the standard video field rate.

SOLUTION - SUMMARY OF THE INVENTION

The frame-rate converting film scanner according to the present invention allows for continuously variable film projection speeds. The essence of the invention lies in sensing an image of the frame location indicia carried by the film after the image has been frame-rate converted by reflection from a rotating multifacet mirror such as a reflecting polygon. The sensed image of the indicia is used to generate a feedback signal for a phase locked loop servo to control the rotational speed of the polygon. The reference signal supplied to the phase locked loop is the television vertical synchronization signal. In this way, regardless of the film drive speed, the rotational rate of the polygon will be such as to effect the desired frame-rate conversion. According to a preferred embodiment of the invention, the scanning apparatus includes a film drive that is continuously adjustable over a range of speeds. A projector including a light source and a scan lens projects an image of a portion of moving film, including an image of the frame position indicia on the film. The projected image is sensed by a solid-state line sensing array which scans the image in a direction generally perpendicular to the length of the film at a standard television line rate to produce the television signal. A frame position sensor disposed adjacent the line sensor senses the projected image of the frame position indicia and produces a frame position signal in response thereto. A rotatable polygon mirror disposed in the optical path between the film and the line sensor displaces the image of the moving film relative to the line sensor in a direction generally parallel to the length of the film. A phase locked loop servo responsive to the frame position signal as a feedback signal and a standard television vertical synchronization signal as a reference signal controls the drive motor that drives the rotatable polygon mirror so that the frame position signal occurs in phase with the vertical synchronization signal.

DESCRIPTION OF THE DRAWING

The invention will be described with reference to the accompanying drawing which is a schematic diagram of the frame-rate converting film scanner showing the continuously variable frame-rate control system according to the present invention.

DESCRIPTION OF THE PREFERRED EMBODIMENT

Certain features disclosed but not claimed in this application are the subject of copending U.S. Patent Application Ser. No. 68,032 entitled FILM SCANNING METHOD AND APPARATUS EMPLOY- ING OPTICAL SPLICE TECHNIQUE FOR FRAME-RATE CONVERSION by D. G. Howe, and copending U.S. Patent Application Ser. No. 68,031 entitled OPTICAL CONFIGURATIONS FOR A ROTATING POLYGON FILM SCANNER by D. G. Howe, both filed on the same day as the present application.

Referring to the FIGURE, the scanner includes a light source 10 and a condensing lens 12 for illuminating a portion of motion picture film 14 in a film gate 16. The film carries frame position indicia 17 (such as film perforations) adjacent each frame. Light from the film gate passes through a beam splitter 18 and is reflected from an optical polygon 20. The optical polygon has a plurality of facets 22a, b, c . . . that are arranged about an axis of rotation 24. Light reflected from the polygon facets is again reflected from the beam splitter and an image of the film gate is formed by scanning lens 26 on a solid-state line sensing array such as a charge coupled device (CCD) line sensor 28. A TV signal is generated line by line, by clocking the CCD line sensor 28 in a known manner. The polyphase clock signals $\phi$ for controlling the CCD line sensor, and horizontal (H) and vertical (V) synchronization signals for composing a standard composite television signal are generated by a clock generator 30. The output of the CCD line sensor 28 and the horizontal and vertical sync signals H and V are supplied as inputs to signal processing electronics 32, which produce a standard composite video signal from the inputs in a known manner.

In operation, the film 14 may be moved continuously through gate 16 by a capstan 34 which is driven by a motor 36. The speed of film movement is controlled by a variable speed motor drive circuit 38 which can be adjusted to provide any film drive speed within a range (e.g. zero to thirty frames per second). Also during operation, polygon 20 may be rotated about axis 24 by a motor 40. From the FIGURE, it can be seen that as polygon 20 rotates, each facet, in its turn, will cause an image of the film moving through the gate to sweep across the line sensor 28. Looking backward through the optical system it can be imagined that, as the polygon rotates, each facet causes a projected image of the line sensor to sweep across the film gate, thereby sensing, line by line, the film in the gate. If the film is moved through the film gate in the direction of arrow A at X frames per second and polygon 20 is rotated in the direction of arrow B at Y frames per second, images of film frames will sweep across the line array sensor in the direction of arrow C at X+Y frames per second.

In order to generate a television signal having a standard field rate Z (e.g. 60 fields per second) the frame images must sweep across the sensor 28 at Z frames per second. This is accomplished according to the invention by sensing the image of the frame location indicia, such as the perforations adjacent each frame in Super 8 film, after the image has been deflected by the polygon to generate a frame location signal. The polygon drive motor is controlled by a phase locked loop servo that employs the vertical sync signal V as a reference and the frame location signal as a feedback signal.

As can be seen in the FIGURE, the film gate 16 allows an image of the film perforations to be projected through the optical system. The film perforations are sensed by a frame position sensor located adjacent line sensor 28. The frame position sensor includes a light sensitive element 42 such as a photodiode, a threshold switch 44 and a one-shot multivibrator 46 for producing a pulse each time an image of a perforation sweeps past the light sensitive element. The light sensitive element 42 is preferably formed on the same substrate as the line sensor 28.

The phase locked loop servo system includes a phase detector 48, a low pass filter 50, and an amplifier 52. Since the frequency of the vertical synchronization signal is 60 Hz, the low pass filter is designed to pass up to about 12 Hz (that is about 1/5 of the frequency of the reference signal for the best operation). Phase detector 48 produces an error voltage proportional to the difference in phase between the reference signal (vertical synchronization signal) and the feedback signal (the frame position signal). After filtering by low pass filter 50, the error signal is amplified by amplifier 52 and employed to control the speed of motor 40. For further stability compensation, a stability compensation loop may be provided as is well known in the design of phase locked loop servos. A stability compensation loop is shown in the FIGURE and includes a tachometer 54, connected to the shaft of motor 40, which produces a voltage proportional to the rotational velocity of the polygon. The output signal of the tachometer is supplied to a summing node 56 as a feedback signal. Summing node 56 also receives the error signal from amplifier 52. The resultant signal produced by the summing node is amplified by an amplifier and motor drive circuit 60 the output of which is applied to drive motor 40. Thus with the phase locked loop circuit in operation, the speed of rotation of polygon 20 will be controlled by the phase locked loop to insure that the frame position indicia are swept past the frame position sensor exactly 60 times per second to thereby produce a 60 field per second television signal.

The invention has been described in detail with particular reference to a preferred embodiment thereof, but it will be understood that variations and modifications can be effected within the spirit and scope of the invention. For example, rather than detecting perforations in the film, the frame position sensor could be adapted to detect optical indicia applied to the film during exposure. Furthermore, two or more frame position sensors spaced apart along the direction of travel of the image of the frame position indicia may be employed along with a reference signal of twice or greater the frequency of the vertical synchronization signal to increase the bandwidth of the servo system.

I claim:

1. Apparatus for scanning motion picture film bearing frame location indicia to produce a standard television signal comprising:

film drive means for continuously moving the film, the film drive means including control means adjustable over a range of frame rates for controlling the speed of the film drive means;

projection means having an optical path, including a light source and a scan lens for projecting an image of a portion of the moving film, the projected image including an image of the frame position indicia;

solid-state line sensing array means for scanning the projected image of the moving film in a direction generally perpendicular to the length of the film at a standard television line rate to produce a television signal;

rotatable multifacet mirror means, disposed in the optical path between the film and the line sensing array means, for displacing the image of the moving film relative to the line sensing means in a direction generally parallel to the length of the film;

indicia sensing means for sensing the displaced image of the frame position indicia and producing a frame position signal in response thereto;

drive means for rotating the mirror means;

means for supplying a periodic reference having a period equal to that of a standard television vertical synchronization signal; and phase locked loop servo control means responsive to the reference signal and the frame position signal for controlling the speed of the mirror drive means so that the frame position signal occurs in phase with the periodic reference signal.

* * * * *